United States Patent
Peters et al.

(10) Patent No.: US 6,358,881 B1
(45) Date of Patent: Mar. 19, 2002

(54) REDUCED NOX COMBUSTION PROMOTER FOR USE IN FCC PROCESSES

(75) Inventors: Alan W. Peters, Highland; Edward F. Rakiewicz, Sykesville; Gordon Dean Weatherbee; Xinjin Zhao, both of Columbia, all of MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/662,598

(22) Filed: Sep. 14, 2000

Related U.S. Application Data

(63) Continuation of application No. 08/833,825, filed on Apr. 10, 1997, now Pat. No. 6,165,933, which is a continuation of application No. 08/435,687, filed on May 5, 1995, now abandoned.

(51) Int. Cl.[7] .......................... B01J 23/58; B01J 23/63; B01J 23/96
(52) U.S. Cl. ...................... 502/304; 502/327; 502/333; 502/341; 502/344; 502/42
(58) Field of Search ................. 502/304, 327, 502/330, 333, 344, 341, 42

(56) References Cited

U.S. PATENT DOCUMENTS

| | | | |
|---|---|---|---|
| 3,459,494 A | 8/1969 | Harris et al. ...................... 23/2 |
| 3,808,121 A | 4/1974 | Wilson ......................... 208/113 |
| 4,124,536 A | 11/1978 | Itoh et al. .................... 252/455 |
| 4,137,151 A | 1/1979 | Csicsery ..................... 208/120 |
| 4,153,535 A | 5/1979 | Vasalos et al. ............... 208/120 |
| 4,171,288 A | 10/1979 | Keith et al. .................. 252/462 |
| 4,198,287 A | 4/1980 | Hemler, Jr. et al. ........ 208/113 |
| 4,214,978 A | 7/1980 | Kennedy et al. ............. 208/120 |
| 4,238,317 A | 12/1980 | Vasalos et al. ................. 502/42 |
| 4,300,997 A | 11/1981 | Meguerian et al. ........... 502/42 |
| 4,448,895 A | 5/1984 | Ono et al. .................... 502/304 |
| 4,626,419 A | 12/1986 | Lewis et al. ................. 423/244 |
| 4,675,308 A | 6/1987 | Wan et al. .................... 502/304 |
| 4,678,770 A | 7/1987 | Wan et al. .................... 502/304 |
| 4,692,318 A | 9/1987 | Tolpin et al. ................ 423/239 |
| 4,708,946 A | 11/1987 | Ohata et al. ................. 502/304 |
| 4,714,694 A | 12/1987 | Wan et al. .................... 502/304 |
| 4,727,052 A | 2/1988 | Wan et al. .................... 502/327 |
| 4,728,635 A | 3/1988 | Bhattacharayya ............ 502/304 |
| 4,738,947 A | 4/1988 | Wan et al. .................... 502/304 |
| 4,780,447 A | 10/1988 | Kim et al. .................... 502/304 |
| 4,839,146 A | 6/1989 | Cho et al. ................. 423/213.5 |
| 4,849,398 A | 7/1989 | Takada et al. ............... 502/303 |
| 4,923,842 A | 5/1990 | Summers ..................... 502/261 |
| 4,940,569 A | 7/1990 | Neal et al. ................... 423/239 |
| 4,965,243 A | 10/1990 | Yamada et al. .............. 502/304 |
| 4,973,399 A | 11/1990 | Green et al. ................. 208/120 |
| 4,996,180 A | 2/1991 | Diwell et al. ................ 502/304 |
| 5,001,103 A | 3/1991 | Koberstein .................... 502/262 |
| 5,024,824 A | 6/1991 | Henk et al. ............... 423/213.5 |
| 5,064,803 A | 11/1991 | Nunan ......................... 502/304 |
| 5,075,275 A | 12/1991 | Murakami et al. .......... 502/303 |
| 5,081,095 A | 1/1992 | Bedford et al. ............. 502/304 |
| 5,160,598 A | 11/1992 | Sawada et al. .............. 204/429 |
| 5,292,991 A | 3/1994 | Lachman et al. ............ 585/850 |
| 5,380,692 A | 1/1995 | Nakatsuji et al. ........... 502/303 |
| 5,462,907 A | 10/1995 | Farrauto et al. ............. 502/304 |
| 5,491,120 A | 2/1996 | Voss et al. ................... 502/304 |
| 5,492,878 A | 2/1996 | Fujii et al. ................... 502/304 |

FOREIGN PATENT DOCUMENTS

| | | | |
|---|---|---|---|
| EP | 045170 | 2/1982 | ............ B01J/21/00 |
| EP | 588691 | 3/1994 | ............ B01J/23/10 |
| JP | 6129355 | 12/1986 | |
| JP | 6305494 | 3/1988 | ............ B64D/11/06 |
| JP | 1304048 | 12/1989 | ............ B01J/23/89 |
| JP | 06-000378 | 1/1994 | ............ B01D/53/36 |
| WO | WO 8706157 | 10/1987 | ............ B01J/23/00 |
| WO | WO 8706158 | 10/1987 | ............ B01J/23/00 |
| WO | WO 9419427 | 9/1991 | ............ C10G/11/05 |
| WO | WO 9406546 | 3/1994 | ............ B01D/53/36 |
| WO | WO 9500235 | 1/1995 | ............ B01D/53/36 |
| WO | WO9503876 | 2/1995 | ............ B01D/53/60 |

OTHER PUBLICATIONS

"Introduction to Ceramics", W. D. Kinger, H. K. Bowen, D. R. Uhlmann, A Wiley–Interscience Publication.

Primary Examiner—Bekir L. Yildirim
(74) Attorney, Agent, or Firm—Beverly J. Artale

(57) ABSTRACT

Compositions comprising a component containing (i) an acidic oxide support, (ii) an alkali metal and/or alkaline earth metal or mixtures thereof, (iii) a transition metal oxide having oxygen storage capability, and (iv) palladium promote CO combustion in FCC processes while minimizing the formation of $NO_x$. The acidic oxide support preferably contains silica alumina. Ceria is the preferred oxygen storage oxide.

14 Claims, No Drawings

REDUCED NOX COMBUSTION PROMOTER FOR USE IN FCC PROCESSES

This application is a continuation of Ser. No. 08/833,825, Apr. 10, 1997, now U.S. Pat. No. 6,165,433 which is a continuation of Ser. No. 08/435,687, May 9, 1995, now abandoned.

BACKGROUND OF THE INVENTION

Public policy and cost/benefit pressures have created an increasing desire to reduce the amount of polluting gases released by industrial processes. As a result, there has been a drive to find ways of decreasing pollution by modifying industrial processes.

In the petroleum refining industry, fluid catalytic cracking (FCC) of hydrocarbons is a commonly used petroleum refining method. In an FCC process, catalyst particles (inventory) are repeatedly circulated between a catalytic cracking zone and a catalyst regeneration zone. In regeneration, coke deposits (from the cracking reaction) on the catalyst particles are removed at elevated temperatures by oxidation. The removal of coke deposits restores the activity of the catalyst particles to the point where they can be reused in the cracking reaction.

While FCC processes are efficient from the point of catalyst use, the regeneration step typically results in the evolution of undesirable gases such as $SO_x$, CO, and $NO_x$. Various attempts have been made to limit the amounts of these gases created during the FCC regeneration step or otherwise to deal with the gases after their formation. Most typically, additives have been used either as an integral part of the FCC catalyst particles themselves or as separate admixture particles in the FCC catalyst inventory in attempts to deal with these problematic gases. For example, magnesium aluminate spinel additives are often used to prevent or minimize emission of $SO_x$ from the regenerator.

Various noble metal catalysts have been used to minimize the emission of CO from the regenerator by promoting combustion of CO to $CO_2$. Unfortunately, the combustion promoter additives typically used to control CO emissions typically cause a dramatic increase (e.g., 300%) in $NO_x$ evolution from the regenerator. While $NO_x$ reduction additives can be added to the catalyst feed to lessen the amount of $NO_x$ emission, it would be much more desirable if a combustion promoter existed which did not cause significant $NO_x$ formation in the first place.

SUMMARY OF THE INVENTION

The invention provides compositions suitable for use in FCC processes which are capable of promoting CO combustion while avoiding significant $NO_x$ formation.

In one aspect, the invention provides compositions for promoting CO combustion in FCC processes, the compositions comprising a component containing (i) an acidic oxide support, (ii) an alkali metal and/or alkaline earth metal or mixtures thereof, (iii) a transition metal oxide having oxygen storage capability, and (iv) palladium. The acidic oxide support preferably contains silica alumina. Ceria is the preferred oxygen storage oxide.

In another aspect, the invention encompasses FCC processes using the combustion promoter compositions of the invention either as an integral part of the FCC catalyst particles themselves or as separate admixture particles in the FCC catalyst inventory.

These and other aspects of the invention are described in further detail below.

DETAILED DESCRIPTION OF THE INVENTION

The invention encompasses the discovery that certain classes of compositions are very effective for CO combustion promotion in FCC processes while minimizing the formation of $NO_x$. The CO combustion promoter compositions of the invention are characterized in that they comprise a component containing (i) an acidic oxide support, (ii) an alkali metal and/or alkaline earth metal or mixtures thereof, (iii) a transition metal oxide having oxygen storage capability, and (iv) palladium.

The acidic oxide support preferably contains acidic silanol or bridged hydroxyl groups. These acid groups are preferably characterized by NMR shifts in the region of −90 to −100 ppm compared to a TMS (trimethyl silane) standard. The support may be crystalline or amorphous. Preferably, the acidic oxide support contains at least some alumina. More preferably, the oxide support contains at least 50 wt. % alumina. The oxide support is preferably an oxide selected from the group consisting of alumina, silica alumina, and lanthana alumina. Amorphous silica aluminas are most preferred. Where an amorphous silica alumina support is used, the support preferably has an alumina to silica molar ratio of about 3–50:1. The acidic oxide support preferably has surface area of at least 50 $m^2/g$, more preferably about 70–200 $m^2/g$.

The alkali and/or alkaline earth metal may be any alkali metal, alkaline earth metal or combinations thereof. The combustion promoter component preferably contains an alkali metal selected from sodium, potassium and mixtures thereof. The amount of alkali/alkaline earth metal present in the combustion promoter component of the invention is preferably about 1–10 parts by weight (measured as alkali/alkaline earth metal oxide) per 100 parts by weight of the oxide support material. While the alkali/alkaline earth metal content is expressed as the amount of corresponding oxide, preferably the alkali/alkaline metal is present in cationic form rather than as discrete oxide.

The transition metal oxide having oxygen storage capability may be any transition metal oxide having oxygen storage capability similar to that of ceria. Preferably, at least a portion of the oxygen storage oxide is ceria. More preferably, the oxygen storage oxide consists essentially of ceria. Other non-stoichiometric metal oxides having known oxygen storage capability may also be used. The oxygen storage oxide is preferably present as a microdispersed phase as opposed to large bulk oxide particles or ions located at exchange sites in the oxide support. The amount of the oxygen storage oxide present in the combustion promoter component may be varied considerably relative to the amount of acidic oxide support. Preferably, the combustion promoter component contains at least about 1 part by weight of oxygen storage oxide per 100 parts by weight of the oxide support material, more preferably at least about 2–50 parts by weight per 100 parts of the oxide support material.

The palladium component is preferably present at least about 100 parts by weight (measured as metal) per million parts of the oxide support material, more preferably about 0.05–5 parts by weight per 100 parts of the oxide support material.

The combustion promoter component may contain minor amounts of other materials which preferably do not adversely affect the combustion promoter function in a significant way. More preferably, however, the combustion promoter component consists essentially of items (i)–(iv) mentioned above. Where the composition of the invention is used as an additive particle for an FCC process, the combustion promoter component may be combined with fillers (e.g. clay, silica, alumina or silica alumina particles) and/or binders (e.g. silica sol, alumina sol, silica alumina sol, etc.) to form particles suitable for use in an FCC process. Preferably, any added binders or fillers used do not significantly adversely affect the performance of the combustion promoter component.

Where the combustion promoter composition is used as an additive particulate (as opposed to being integrated into the FCC catalyst particles themselves), the amount of combustion promoter component in the additive particles is preferably at least 50 wt. %, more preferably at least 75 wt. %. Most preferably, the additive particles consist entirely of the combustion promoter component. The additive particles are preferably of a size suitable for circulation with the catalyst inventory in an FCC process. The additive particles preferably have an average particle size of about 20–200 μm. The additive particles preferably have a Davison attrition index (DI) value of about 0–45, more preferably about 0–15.

If desired, the combustion promoter composition of the invention may be integrated into the FCC catalyst particles themselves. In such case, any conventional FCC catalyst particle components may be used in combination with the combustion promoter composition of the invention. If integrated into the FCC catalyst particles, the combustion promoter composition of the invention is preferably represents at least about 0.02 wt. % of the FCC catalyst particle, more preferably about 0.1–10 wt. %.

While the invention is not limited to any particular method of manufacture, the combustion promoter component of the invention is preferably made by the following procedure:

(a) impregnate the acidic oxide porous support particles with an alkali/alkaline earth metal oxide source and an oxygen storage oxide source to achieve the desired alkali/alkaline earth metal and oxygen storage oxide content, (b) calcine the impregnated support of step (a), (c) impregnate the calcined support from step (b) with a source of palladium metal, and (d) calcine the impregnated support from step (c).

The sources of alkali/alkaline earth metal oxide and oxygen storage oxide are preferably slurries, sols and/or solutions of the metal oxides themselves or salts of the respective metals which decompose to oxides on calcination or combinations of oxides and salts. If desired, the individual constituents may be separately added to the support particles with a calcination step in between each addition. If desired, the impregnated particles are spray dried before the calcination of step (d). The calcination steps are preferably performed at about 450–750° C.

The combustion promoter component may be used as a separate additive particle or as an integral part of an FCC catalyst particle. If used as an additive, the combustion promoter component may itself be formed into particles suitable for use in an FCC process. Alternatively, the combustion promoter component may be combined with binders, fillers, etc. by any conventional technique. See for example, the process described in U.S. Pat. No. 5,194,413, the disclosure of which is incorporated herein by reference.

Where the combustion promoter component of the invention is integrated into an FCC catalyst particle, preferably the component is first formed and then combined with the other constituents which make up the FCC catalyst particle. Incorporation of the combustion promoter component directly into FCC catalyst particles may be accomplished by an known technique. Example of suitable techniques for this purpose are disclosed in U.S. Pat. Nos. 3,957,689; 4,499, 197; 4,542,188 and 4,458,623, the disclosures of which are incorporated herein by reference.

The compositions of the invention may be used in any conventional FCC process. Typical FCC processes are conducted reaction temperatures of 450 to 650° C. with catalyst regeneration temperatures of 600 to 850° C. The compositions of the invention may be used in FCC processing of any typical hydrocarbon feedstock. The amount of the combustion promoter component of the invention used may vary depending on the specific FCC process. Preferably, the amount of combustion promoter component used (in the circulating inventory) is about 0.1–15 wt. % based on the weight of the FCC catalyst in the circulating catalyst inventory. The presence of the compositions of the invention during the FCC process catalyst regeneration step effectively promotes CO combustion while dramatically reducing the level of $NO_x$ emitted during regeneration compared to conventional combustion promoters.

EXAMPLE 1

A silica alumina particulate support containing 6 wt. % silica was impregnated sodium carbonate solution, dried and calcined to achieve 6 wt. % Na measured as $Na_2O$ based on the weight of the silica alumina. The Na-containing silica alumina particles were then impregnated with a solution of cerium nitrate and then dried to achieve a ceria content of about 22 wt. % based on the weight of the silica alumina particles. The ceria-containing compositions were then impregnated with a palladium nitrate solution to achieve a palladium content of about 0.1 wt. % based on the weight of the silica alumina particles. The impregnated particles were then dried and calcined at about 704° C. to form a particulate composition in accordance with the invention.

EXAMPLE 2

The 10 g of the composition of example 1 was admixed with 2000 grams of a commercial FCC catalyst (Grace Davison Orion®922G ECAT). The admixture was then used to crack a Countrymark hydrocarbon feedstock in an FCC pilot plant (DCR) unit. The cracking was performed at a 75% conversion rate and 1000 g/hr catalyst feed rate. As a comparison example, the same catalyst was run without the composition of example 1. The $NO_x$ emission measured from the FCC unit regenerator was substantially unchanged when the composition of example 1 was used compared to the control example. The composition of example 1 had CO combustion activity greater than or comparable to typical commercial combustion promoters.

What is claimed is:

1. A particulate composition suitable for use in a fluidized catalytic cracking process, said composition having a particle size of about 20–200 μm and comprising (i) an acidic oxide support containing at least 50 wt. % alumina (ii) an alkali metal or mixtures thereof, (iii) $CeO_2$, and (iv) palladium wherein said composition comprises about 1–10 parts by weight of said alkali metal, measured as alkali metal oxide, at least 1 part by weight of $CeO_2$ and about 0.01–5.0 parts by weight palladium, all parts being 100 parts by weight of said acidic oxide support material, and wherein said composition promotes CO combustion during a FCC catalyst regeneration process step while simultaneously reducing the level of NOx emitted during the regeneration step.

2. The composition of claim 1 wherein said acidic oxide support is selected from the group consisting of alumina, silica alumina, and lanthana alumina.

3. The composition of claim 2 wherein said oxide support is a silica alumina.

4. The composition of claim 3 wherein said silica alumina has an alumina; silica mole ratio of about 3–50:1.

5. The composition of claim 1 wherein said composition contains an alkali metal selected from the group consisting of sodium, potassium, and mixtures thereof.

6. The composition of claim 1 wherein said composition contains about 2 to 50 parts by weight of $CeO_2$ per 100 parts by weight of said acidic oxide support material.

7. A fluid cracking catalyst comprising (a) a cracking component suitable for catalyzing the cracking of hydrocarbons and (b) a $NO_x$ reduction component which promotes oxidation comprising (i) an acidic oxide support comprising at least 50 wt. % alumina, (ii) about 1–10 parts by weight of an alkali metal or mixtures thereof, measured as alkali metal oxide per 100 parts by weight of said acidic oxide support, (iii) at least 1 part of $CeO_2$ per 100 parts by weight of said acidic oxide support, and (iv) 0.01–5 parts by weight of palladium per 100 parts by weight of said acidic oxide support, wherein component (b) is contained in particles having a particle size of 20–200 $\mu$m.

8. The cracking catalyst of claim 7 wherein said cracking catalyst comprises an admixture of component (a) in particulate form and component (b) in particulate form.

9. The cracking catalyst of claim 7 wherein said cracking catalyst is a particulate composition comprising integral particles which contain both components (a) and (b).

10. A method of reducing NOx emissions in the presence of CO oxidation promoters during fluid cracking of a hydrocarbon feedstock into lower molecular weight components, said method comprising contacting hydrocarbons with a cracking catalyst at elevated temperature whereby said lower molecular weight components are formed, said catalyst comprising (a) a cracking component suitable for catalyzing the cracking of hydrocarbons, and (b) a component comprising (i) an acidic oxide support comprising at least 50 wt. % alumina, (ii) about 1–10 parts by weight of an alkali metal or mixtures thereof, measured as alkali metal oxide, per 100 parts by weight of said acidic oxide support, (iii) at least 1 part by weight of $CeO_2$ per 100 parts by weight of acidic oxide support, and (iv) about 0.01–5 parts by weight of palladium per 100 parts by weight of said acidic oxide support.

11. The method of claim 10 wherein said catalyst is fluidized during said contacting and said method further comprises recovering used cracking catalyst from said contacting step and treating said used catalyst under conditions suitable to regenerate said catalyst.

12. The fluid cracking catalyst of claim 7 wherein said catalyst comprises about 0.1–10 wt. % of component (b).

13. The composition of claim 6 wherein said alkali metal consists essentially of sodium.

14. The fluid cracking catalyst of claim 7, wherein said alkali metal consists essentially of sodium.

* * * * *